United States Patent [19]

Yamasaki

[11] Patent Number: 5,789,905
[45] Date of Patent: Aug. 4, 1998

[54] VOLTAGE STEP-UP CIRCUIT AND ITS CONTROL CIRCUIT

[75] Inventor: Koichi Yamasaki, Kyoto, Japan

[73] Assignee: Rohm Co., Ltd., Kyoto, Japan

[21] Appl. No.: 824,440

[22] Filed: Mar. 26, 1997

[30] Foreign Application Priority Data

Mar. 28, 1996 [JP] Japan ................... 8-074852

[51] Int. Cl.$^6$ .............................................. G05F 1/10
[52] U.S. Cl. .............................................. 323/222
[58] Field of Search ........................ 323/222; 363/59

[56] References Cited

U.S. PATENT DOCUMENTS

| | | | |
|---|---|---|---|
| 4,355,277 | 10/1982 | Davis et al. | 323/222 |
| 4,961,006 | 10/1990 | Pace et al. | 327/109 |
| 5,321,299 | 6/1994 | Ohkawa et al. | 323/222 |
| 5,677,617 | 10/1997 | Tokai et al. | 323/222 |

*Primary Examiner*—Stuart N. Hecker
*Attorney, Agent, or Firm*—Fish & Richardson P.C.

[57] ABSTRACT

This circuit improves power efficiency and reduces number of parts required in a voltage step-up circuit. This circuit includes a switching control circuit and a voltage transformer circuit. The control circuit is a push-pull circuit comprising a constant-current-on type transistor Tr1 and a differential-pulse-on type transistor Tr2. The transformer circuit comprises an NPN type switching transistor Tr3, a coil L1, a diode D1, and a electrolytic capacitor C2. With Tn being the duration of the ON state of Tr3, and Tf the duration of the OFF state, the output voltage is Vcc(Tn+Tf)/Tf. Since the constant-current-on type transistor Tr1 is laid closer to the power source than the differential-pulse-on type transistor Tr2, the switching transistor Tr3 can be driven directly and no PNP type transistor is necessary.

5 Claims, 4 Drawing Sheets

VOLTAGE STEP-UP CIRCUIT AND ITS CONTROL CIRCUIT

BACKGROUND OF THE INVENTION

1. Field of the Invention

This present invention relates to a voltage step-up circuit and its control circuit. It is more particularly related to a voltage step-up circuit and its control circuit which stores energy in an inductance element when an NPN type switching transistor is ON, and supplies energy in superposition on an input voltage when the transistor is OFF.

2. Description of the Prior Arts

In the history of switching power sources for electronic apparatus, voltage step-down circuits became widely used prior to wide use of voltage step-up circuits. One example is a DC/DC converter which generates 5V voltage for general ICs by stepping down, for example, 12V voltage generated for an LCD panel.

FIG. 4 shows an example of a configuration of a conventional voltage step-down circuit. This configuration can be divided into a control circuit 100 which controls switching, and a transformer circuit which actually executes voltage transformation. The control circuit 100 comprises transistors Tr21 and Tr22 and a capacitor C10. The transformer circuit 200 comprise a PNP type switching transistor Tr24, a diode D10, a coil L10, and an electrolytic capacitor C20.

The transistor Tr21 in the control circuit 100 is instantaneously switched on by a differential pulse which appears at the right terminal of the capacitor 10 (hereafter, this type of transistor is called "differential-pulse-on type"). On the other hand, the transistor Tr22 is part of a constant current circuit not shown in FIG. 4, and a constant current flows when it is ON (hereafter this type of transistor is called "constant-current-on type"). The transistor Tr21 is ON when the switching transistor Tr24 should be switched on, while the transistor Tr22 is ON when it should be switched off. Therefore, the transistor Tr21 and Tr22 form a push-pull circuit. An instruction to make the switching transistor ON or OFF comes as a switching instruction signal (hereafter, simply called "an instruction signal"), which is not shown in FIG. 4, given to the control circuit 100.

The transformer circuit 200 steps down the power source voltage Vcc according to a ratio of duration of ON state of the switching transistor Tr24 to that of OFF state. A stepped down voltage Vout appears at the cathode of the diode D10. If Ton and Toff mean duration of ON and OFF states of the switching transistor Tr24, Vcc and Vout satisfy the following equation:

Vout=Vcc * Ton/(Toff+Ton)  (Equation 1).

The reason a PNP type transistor is used as a switching transistor is that the voltage drop of Vout to Vcc falls on a saturation voltage range of the transistor. If an NPN type is used, the voltage drop becomes as large as $V_{BE}$, and a power efficiency becomes less. The constant-current-on type transistor Tr22 is used to switch on the switching transistor Tr24 in order to guarantee a steady drop in voltage by keeping constant the current that flows in the switching transistor Tr24. The differential-pulse-on type transistor Tr21 is used to shorten an elapsed time before the switching transistor Tr24 becomes OFF. This is to shorten the time needed by the transistor to pass a non-saturation area, and to improve the efficiency of the power. It is advantageous for a differential-pulse-on type transistor that the power consumption stays minimum, since it is ON for a short time.

However, apparatuses using batteries as their primary power source have increased, following recent downsizing and improved portability of personal electronic equipment. These apparatuses may have, for example, ICs of 5V drive in their load circuits, despite the fact that their primary power source has a voltage of only 3V. Therefore, demand for voltage step-up circuits have increased.

FIG. 5 shows an example of a configuration of a conventional voltage step-up circuit. This is designed after the pre-existing voltage step-down circuit shown in FIG. 4. The control circuit 100 is common in both figures. The transformer circuit 300 is similar to the transformer circuit 200 in FIG. 4 in parts used and in design, but differs in the following points.

1. In the transformer circuit 300, the switching transistor Tr23 is of NPN type. While the switching transistor Tr23 is ON, energy is stored in a coil L11 and, when it is OFF, the stored energy superposes on the power source voltage Vcc. A voltage higher than Vcc appears at the cathode of the diode D11. The relationship between Vcc and Vout is expressed as follows, with Ton and Toff being the same as in Equation 1.

Vout=Vcc (Ton+Toff )/Toff  (Equation 2)

2. The transistor Tr24 in FIG. 4 also exists in FIG. 5. This transistor works as an inverter to activate a switching transistor Tr23. A resistor R10 is also placed to stabilize the base voltage of the switching transistor Tr23.

SUMMARY OF THE INVENTION

As described above, a voltage can be stepped up by the circuit shown in FIG. 5. On the other hand, a demand for longer battery life for use in electronic equipment is still persistent. This invention is created to meet this demand. Its object is to provide a new voltage step-up circuit and control circuit based on a point of view different from the conventional development of a voltage step-up circuit designed based on a voltage step-down circuit.

(1) For the object described above, a control circuit in the present invention controls a voltage step-up circuit that stores energy in an inductance element when an NPN type switching transistor is ON, and superposes the energy on an input voltage and supplies this energy when the NPN type switching transistor is OFF. The control circuit comprises a first NPN type transistor which is switched on and supplies a constant current when an instruction signal to switch on or off a switching transistor indicates ON and a second NPN type transistor which is temporarily switched on when the instruction signal indicates OFF. The emitter of the first transistor is connected to the collector of the second transistor and these transistors are laid out in this order, between a power source and a ground. The emitter of the first transistor is connected to the base of the switching transistor.

In this configuration, the constant-current-on type transistor (the first transistor) and the differential-pulse-on type transistor (the second transistor) are laid out in a reverse order of a conventional control circuit. Therefore, a PNP type transistor used as an inverter in a transformer circuit is not necessary in this device.

In this configuration, the first transistor is switched on when the instruction signal indicates ON of the switching transistor. The emitter of the first transistor is connected to the base of the switching transistor. Therefore, when the first transistor becomes ON, the switching transistor also becomes ON. When the instruction signal indicates OFF, the first transistor becomes OFF and the second transistor is temporarily ON. When the second transistor is ON, the base of the switching transistor is discharged, so the switching transistor rapidly becomes OFF. As a consequence, a switching action can be accomplished.

(2) On the other hand, a voltage step-up circuit in the present invention comprises an NPN type switching transistor with its emitter being grounded, a first transistor which is switched on and lets a constant current flow when an instruction signal which indicates ON or OFF of the switching transistor indicates ON, a second NPN type transistor which has the collector connected to both the emitter of the first transistor and the base of the switching transistor and is temporarily switched on when the instruction signal indicates OFF, an inductance element of which one terminal is connected to the collector of the switching transistor and the other to the power source, a diode of which anode is connected to the collector of the switching transistor, and a capacitor with one terminal connected to the cathode of the diode and the other grounded. The voltage step-up circuit steps up the voltage of the power source. The final voltage appears at the cathode of the diode.

In this configuration, the operation that the switching transistor is ON when the instruction signal indicates ON and OFF when the instruction signal indicates OFF is the same as in (1). While the switching transistor is ON, energy is stored in the inductance element. When it becomes OFF, a route from the power source-the inductance element-anode to cathode of the diode-output is detached from the switching transistor, and a sum of the power source and the voltage attributed to the accumulated energy comes up as the output. Step-up of the voltage is thus realized.

DESCRIPTION OF THE PREFERRED EMBODIMENT

Figure 4:
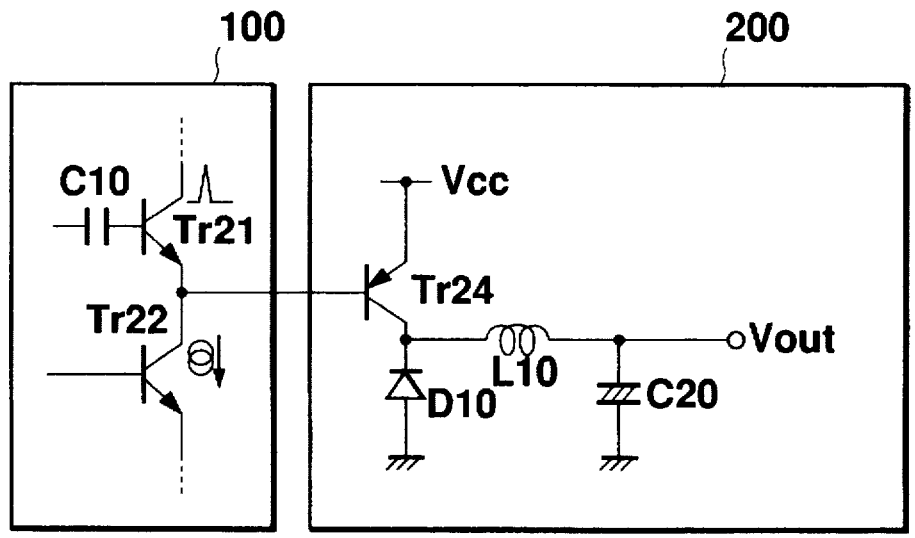
FIG. 4 shows an example of a configuration of a conventional voltage step-down circuit.
Figure 5:
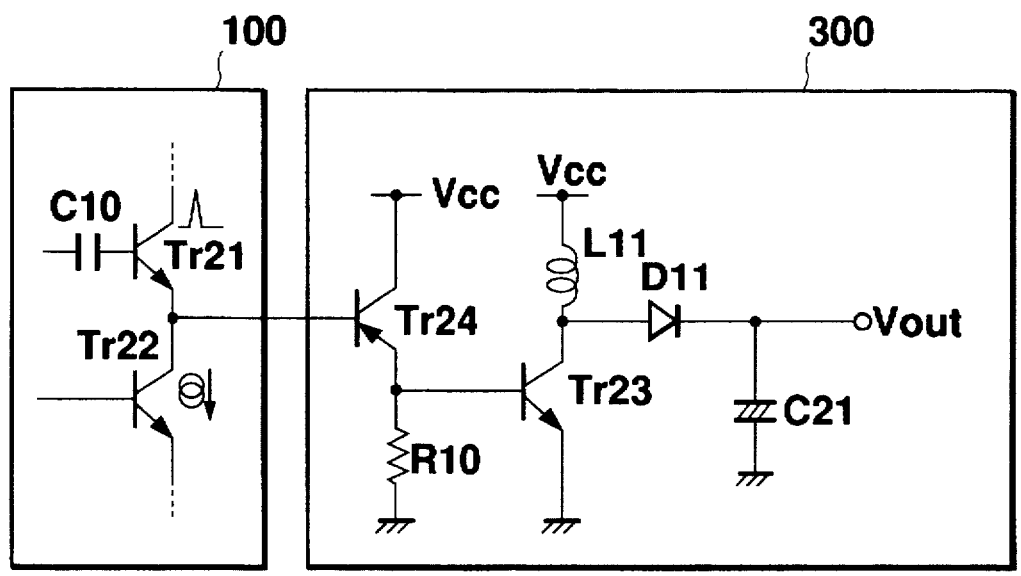
FIG. 5 an example of a configuration of a conventional voltage step-up circuit.

The conventional voltage step-up circuit shown in FIG. 5 was designed utilizing the structure of the voltage step-down circuit shown in FIG. 4. In the voltage step-down circuit in FIG. 4, a PNP type transistor is employed as a switching transistor, due to a voltage drop problem. This transistor is simply left in the voltage step-up circuit in FIG. 5. However, in the present embodiment, this PNP type transistor is eliminated by using another circuit configuration, since this PNP type transistor is no longer necessary to avoid the voltage drop problem which does not matter in the configuration shown in FIG. 5

Figure 1:
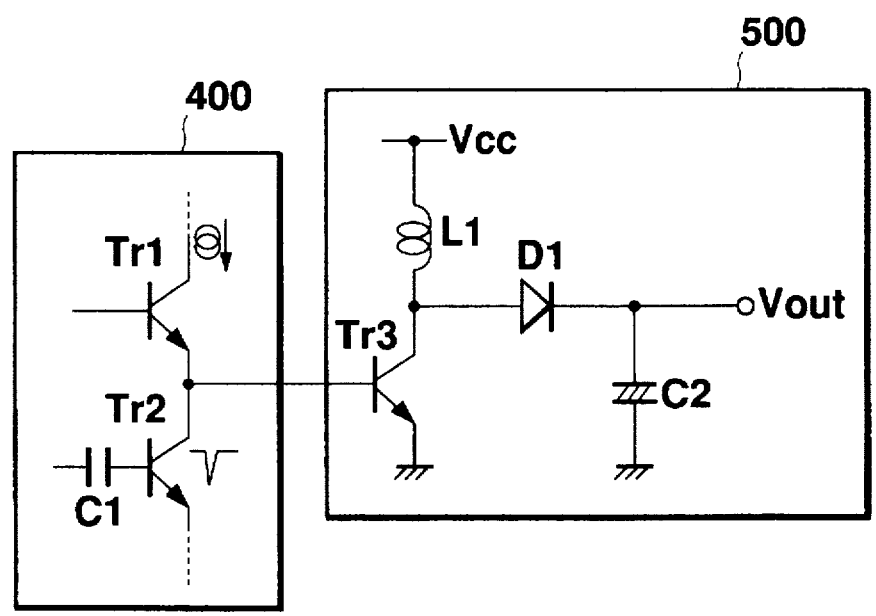
FIG. 1 shows a configuration of the voltage step-up circuit related to the present invention.

FIG. 1 shows a configuration of a voltage step-up circuit related to the present invention. This circuit roughly comprises a control circuit 400 and a transformer circuit 500. The control circuit 400 comprises a constant-current-on type transistor and a differential-pulse-on type transistor, as it does in FIG. 5. However, they are placed in the reverse order from that shown in FIG. 5. In other words, a first transistor Tr1 which is a constant-current-on type is placed near the power source, and a second transistor Tr2 which is a differential-pulse-on type is placed near the ground. At the base of the Tr2 lies a capacitor C1 to make differentiated wave forms. Transistors which are fast enough in operation speed to fulfill design specifications and also low in saturated voltage are chosen as these transistors. A capacity of the capacitor C1 is a range of, for example, 1000 pF.

The transformer circuit 500 in the present invention is like a circuit without a PNP type transistor and a resistor R10 in the transformer circuit 300 in FIG. 5. A switching transistor is directly driven by a control circuit 100. In other words, the transformer circuit 500 comprises an NPN type switching transistor Tr3 whose emitter is grounded, an inductance element coil L1 whose one terminal is connected to the collector of Tr3 and the other to a power source, a diode D1 whose anode is connected to the collector of the switching transistor Tr3, and an electrolytic capacitor C2 which has one terminal connected to the cathode of the diode D1 and the other terminal grounded. This circuit 500 steps up the power source voltage Vcc and the final voltage appears on the cathode of the diode D1. The operation speed and saturation voltage of these transistors should be considered in the same way as described above. The inductance of the coil L1 is decided by taking into consideration the current to flow through and voltage ripples to be allowed. Inductance may be, for example, 100 µH. The power source voltage Vcc may be 3V, for instance, and Vout may be in a range of 3V to several tens of volts. If the current that flows through a load circuit is 1A in design specifications, the current capacity of the diode D1 should be 2A, for example. The electrolytic capacitor C2 may be 100 µF. The capacitor is, of course, not necessarily an electrolytic one. Any capacitor of the same capacity and break-down voltage will work.

In this configuration, the order of the constant-current-on type transistor and the differential-pulse-on type transistor is reversed from the order of FIG. 5. Therefore, the PNP type transistor in FIG. 5 may be eliminated. All transistors in this configuration are of NPN type, so they are more advantageous in their parts size and operation speed than PNP types.

The operation of the above circuit is next explained.

When a switching instruction signal, which is not shown in the figures, indicates an ON state of the switching transistor Tr3, the transistor Tr1 is switched on. As a consequence, the switching transistor Tr3 is switched on. At this moment, a current generated by the voltage between the two terminals of the coil L1 flows therethrough. Energy that is proportional to the square of the current and the inductance of the coil L1 is stored.

On the other hand, when the instruction signal indicates OFF, the transistor Tr1 becomes OFF. At this moment, the transistor Tr2 is temporarily switched on, based on a differential pulse. As a result, the electric charge stored at the base of the switching transistor Tr3 is rapidly discharged, and Tr3 becomes OFF. A switching operation is performed as described above. The relationship between Vcc and Vout is the same as in Equation 2.

Figure 2:
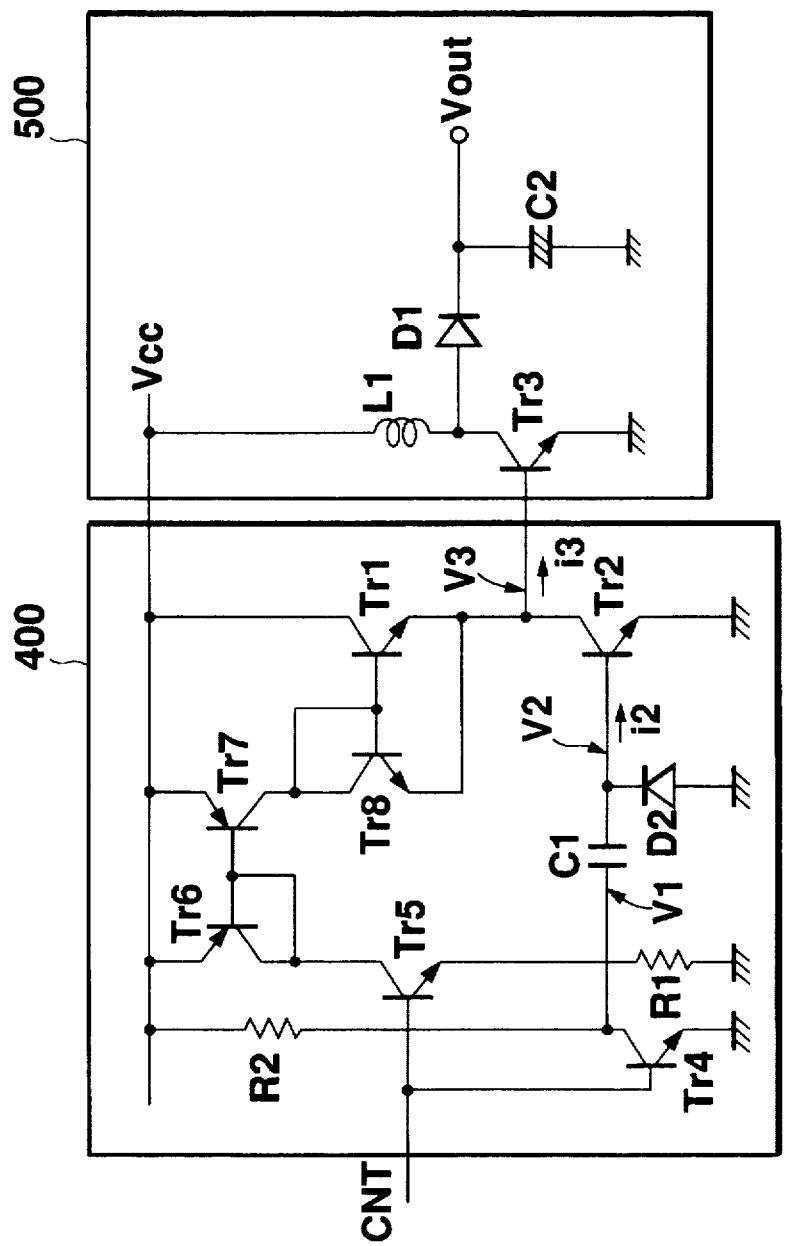
FIG. 2 is a detailed configuration of the voltage step-up circuit shown in FIG. 1.

FIG. 2 shows a configuration in detail of the voltage step-up circuit in FIG. 1. An example configuration of a constant current circuit and a differential pulse generator circuit is depicted. The switching instruction signal is shown as CNT signal in FIG. 2. When this signal is at a high level, the switching transistor is switched on, and when low, this transistor is switched off. The constant current circuit comprises transistors Tr5-8 which form a current mirror circuit, a transistor Tr1, and a resistor R1. When the CNT signal is at a high level, a constant current determined by the current which flows through the resistor R1 flows through the transistor Tr1.

The differential pulse generator circuit comprises a transistor Tr4 which is controlled by the CNT signal, a resistor R2 which pulls up the collector of the transistor Tr4, a capacitor C1 which has one terminal connected to the collector of Tr4, and a diode D2 whose cathode is connected to the second terminal of the capacitor C1 and whose anode is grounded. The base of the transistor Tr2 is connected to the cathode of the diode D2. In summary, the transistor Tr4 becomes OFF when the CNT signal is at a low level. Consequently, V1 as well as V2 become high, and the transistor Tr2 is switched on, accelerating transition to the OFF state of the switching transistor Tr3.

Figure 3:
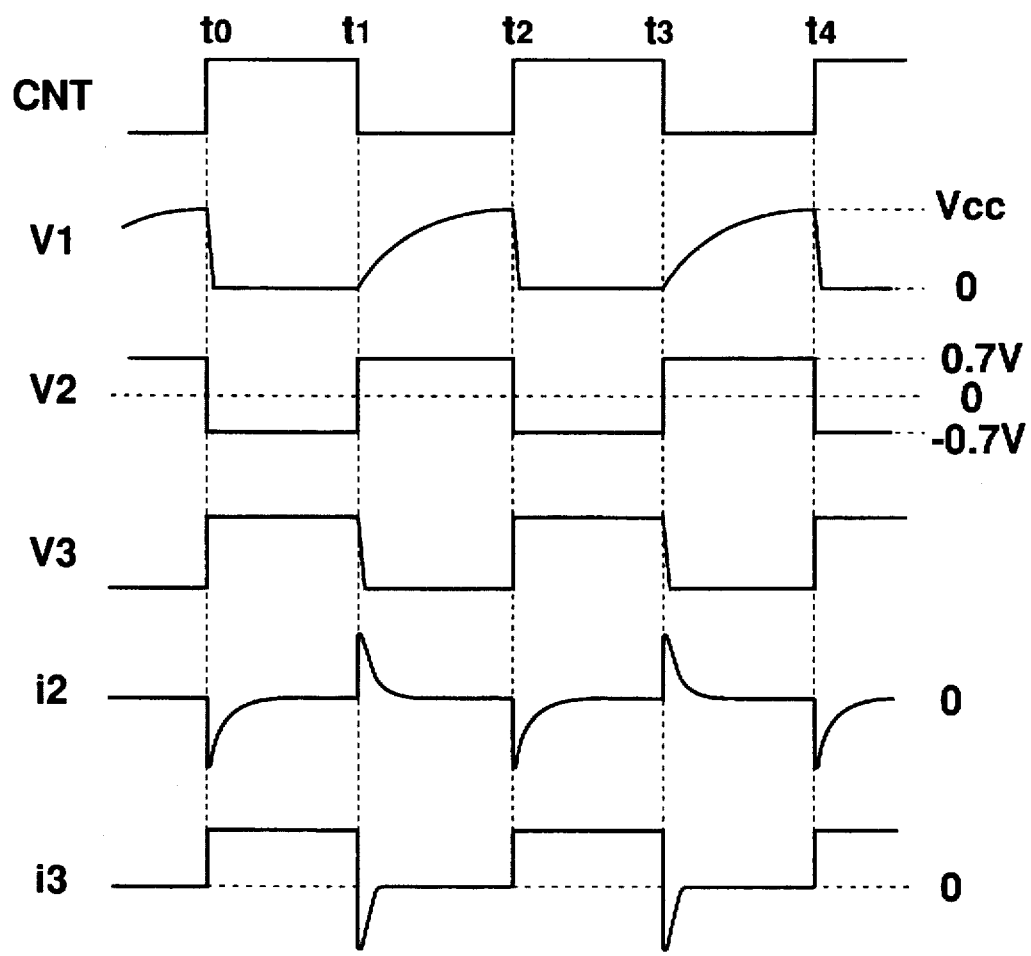
FIG. 3 shows wave forms of voltages and currents of a main part of the present voltage step-up circuit in accordance with changes in the CNT signal.

FIG. 3 shows wave forms of voltages and currents in a main part of the voltage step-up circuit with changes of the CNT signal. V1 in this figure shows the collector voltage of the transistor Tr4, V2 is the base voltage of the transistor Tr2, V3 is the base voltage of the switching transistor Tr3, and i2 and i3 are the currents which flow into the respective bases of the transistors Tr2 and Tr3. In FIG. 3, duration of CNT signal high and low levels of the CNT signal are set to be the same. In this case Vout is equal to 2Vcc from the Equation 2. Hereafter, voltages V1-3 are next explained.

At time t1 in FIG. 3, the CNT signal changes from a high level to a low level, and the transistor Tr5 then becomes OFF as does the transistor Tr1. At t1, the transistor Tr4 becomes OFF and V1 gradually goes up according to a time constant decided by the resistor R2 and the capacitor C1. V2 responds differentially to a change in V1, and goes up rapidly at time t1. In this circuit configuration, there is no need for V2 to stop at 0V, so V2 goes beyond this value. However, V2 stops at 0.7V, due to the $V_{BE}$ of the transistor Tr2. In response to the rise in V2, the transistor Tr2 becomes On, and V3 drops, with the switching transistor Tr3 going OFF.

At time t2 when the CNT signal steps up to the high level, the transistor Tr4 becomes ON and V1 rapidly drops to the low level. In response to this, V2 also drops. There is no need for V2 to stop at the ground voltage 0V, so it drops lower, stopping at −0.7V, due to the existence of the diode D2. With the drop of V2, the transistor Tr2 becomes OFF, V3 becomes high, and the switching transistor Tr3 then becomes ON. After t3, the same operation is repeated.

The currents i2 and i3 are explained next. At time t1, V2 rises and i2 rapidly flows into the base of the transistor Tr2. Therefore the transistor Tr2 is instantaneously switched on and rapidly discharges the base of the switching transistor Tr3. This is shown by i3 in FIG. 3 instantaneously taking a very large negative value. In this way, transition to the OFF state of the transistor Tr3 is quickened, and the time the transistor stays in a non-saturated area is shortened.

At time t2, the transistor Tr1 is switched to the ON state. However, i2 flows as a differential pulse in a direction opposite to the case of t1. Therefore, the transistor Tr2 is rapidly switched off, and the current that flows from the power source to the ground is kept minimum, while both the transistors Tr1 and Tr2 are ON.

While the CNT signal is in the high level, the transistor Tr1 is ON and a constant current flows. On the other hand, the transistor Tr2 is OFF, so i3 becomes constant. Therefore, the circuit supplied to the transformer circuit 500 is known, and it is convenient for stabilizing the transforming operation and for circuit design.

The above is an explanation of configurations and actions of the present embodiment. For this embodiment, attention should be paid to the fact that configurations of a constant current circuit and a differential pulse generator circuit are fairly flexible. It is also possible for the voltage step-up circuit of the present invention or a part of it to be integrated as a whole IC or a part of an IC. One method of making ICs is to integrate the parts of the control circuit 400 in FIG. 2 except for the resistor and the capacitor which can be externally provided. Resistors and capacitors can be conveniently chosen depending on circuit design.

In the present invention, it is not necessary to use a PNP type transistor in the voltage step-up circuit. In the present embodiment, the control circuit of the voltage step-up circuit has the constant-current-on type transistor and the differential-pulse-on type transistor in an order opposite to the conventional one. As a consequence, power consumed by this transistor is economized and the power efficiency improves. It is also advantageous from a viewpoint of current semiconductor manufacturing techniques which have difficulty producing high quality PNP type transistors, since PNP type transistors, which are generally large in size, can be eliminated from the circuit.

The voltage step-up circuit of the present invention uses the control circuit described above. This step-up circuit is advantageous in terms of power efficiency, number of parts, and integration. Therefore, the step-up circuit can be used for many kinds of electronic apparatus, including portable cameras, personal computers, audio equipment, DC/DC converters for displaying equipment, and AC/DC converters.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A control circuit to control a voltage step-up circuit which stores energy in an inductance element when an NPN type switching transistor is ON and superposes this energy on an input voltage and supplies it as an output when the switching transistor is OFF, comprising:

a first NPN type transistor which allows a constant current flow when an instruction signal indicating an ON or OFF state of the switching transistor indicates an ON state, and a second NPN type transistor which is temporarily switched on when the instruction signal indicates an OFF state;

wherein an emitter of the first transistor is connected to a collector of the second transistor, the first and the second transistors are arranged in this order between a power source and a ground, and the emitter of the first transistor is directly connected to a base of the switching transistor.

2. The control circuit according to claim 1, wherein the first transistor is included in a current mirror circuit.

3. The control circuit according to claim 1, wherein the second transistor is switched on by a differential pulse which is induced by transition of the instruction signal.

4. A voltage step-up circuit which steps up the source voltage and takes it out from a cathode of a diode, comprising:

an NPN type switching transistor whose emitter is grounded;

a first transistor of an NPN type which is switched on, allowing a constant current flow when an instruction signal to indicate ON or OFF state of the switching transistor indicates an ON state;

a second transistor of an NPN type which has a collector connected to both an emitter of the first transistor and a base of the switching transistor and which is temporarily switched on when the instruction signal indicates an OFF state;

an inductance element, one terminal of which is connected to a collector of the switching transistor and the other of which is connected to a power source;

a diode whose anode is connected to the collector of the switching transistor; and a capacitor, one terminal of which is connected to a cathode of the diode and the other being grounded.

5. The circuit according to claim 4, wherein the circuit is integrated as an IC.

* * * * *